United States Patent [19]
Diehl et al.

[11] Patent Number: 5,642,698
[45] Date of Patent: Jul. 1, 1997

[54] INDUCTION SYSTEM FOR INTERNAL COMBUSTION ENGINE

[75] Inventors: Roy Edward Diehl, Northville; Matt Adrian Vance, Dearborn, both of Mich.

[73] Assignee: Ford Motor Company, Dearborn, Mich.

[21] Appl. No.: 697,100

[22] Filed: Aug. 19, 1996

[51] Int. Cl.⁶ .................................................. F02M 35/10
[52] U.S. Cl. .............................. 123/184.42; 123/184.54
[58] Field of Search ...................... 123/184.42, 184.47, 123/184.54, 339

[56] References Cited

U.S. PATENT DOCUMENTS

| | | | |
|---|---|---|---|
| 3,606,871 | 9/1971 | Gropp et al. | 123/409 |
| 3,814,069 | 6/1974 | Croft et al. | 123/184.42 |
| 4,089,349 | 5/1978 | Schenk | 137/859 |
| 4,231,329 | 11/1980 | Ishida | 123/184.46 |
| 4,492,249 | 1/1985 | Arino et al. | 137/515 |
| 4,651,766 | 3/1987 | Ransom | 137/116.3 |
| 4,760,833 | 8/1988 | Tatyrek | 123/574 |
| 4,771,740 | 9/1988 | Koike | 123/184.42 |
| 4,901,680 | 2/1990 | Matsumoto | 123/184.47 |
| 4,953,447 | 9/1990 | Bender | 60/397 |
| 5,014,654 | 5/1991 | Ishibashi | 123/568 |
| 5,117,738 | 6/1992 | Horner, Jr. | 137/854 |

FOREIGN PATENT DOCUMENTS

| | | | |
|---|---|---|---|
| 0167836 | 1/1986 | European Pat. Off. | 123/184.42 |
| 1-224421 | 9/1989 | Japan | 123/184.42 |

*Primary Examiner*—David A. Okonsky
*Attorney, Agent, or Firm*—Jerome R. Drouillard

[57] ABSTRACT

An induction system for a multicylinder internal combustion engine includes a log for receiving air drawn into the engine and individual runners extending from the log to intake ports of the engine. An antireversion air manifold supplied with air by the log has flow control valves and branches extending between a main passage of the antireversion air manifold and the individual intake manifold runners, with the branches connecting with the runners at positions situated between individual throttle plates and intake valves.

16 Claims, 1 Drawing Sheet

INDUCTION SYSTEM FOR INTERNAL COMBUSTION ENGINE

BACKGROUND OF THE INVENTION

1. Field of the Invention

The present invention relates to an induction system for a multicylinder internal combustion engine in which a plurality of port-throttled intake runners is supplied with air by a single unthrottled air log.

2. Disclosure Information

Internal combustion engines typically include one or more throttle plates positioned either as a single throttle plate in an air log upstream of individual cylinder runners or within the individual cylinder runners themselves. If a single air throttle plate is used far upstream of the intake valves positioned at the various cylinders, the pressure of the entire manifold must change if the quantity of air flowing through the manifold is to change in response to an altered throttle angle, as prompted by the operator, whether it be a human operator or, for that matter, an automotive speed control. Of course, any change of the air pressure within an entire intake manifold will be accompanied by a time lag in the response of the engine.

Automotive designers seeking to avoid throttle response problems have produced intake manifolds or induction systems using individual throttle plates mounted at the bottom of the intake runners close to the intake valves. Such a configuration allows good throttle response by limiting the volume of the manifold which is subjected to subatmospheric, i.e., vacuum, pressure. However, if a source of engine vacuum is needed either to draw gases from the engine crankcase as in a positive crankcase ventilation system, or to recirculate exhaust gas, or to operate various vacuum powered devices such as a power brake booster or motors associated with a climate control system of the vehicle, it is necessary to place vacuum taps into the intake runners between the individual throttle plates in the intake valves. One automotive engine marketed by Bayerische Motoren Werke (BMW) utilizes such a scheme, in which an air manifold is connected with individual pipes running to the inlet runners between the individual throttle plates and intake valves. Unfortunately, the BMW system has no control valves located in the individual pipes or branches extending between intake runners and the air manifold. As a result, the pressure within each of the manifold runners is lowered to a vacuum or subatmospheric level because the individual cylinders are interconnected by the air manifold. Because the cylinders are lowered to subatmospheric pressure, the BMW system will operate with a pumping loss that is avoided by a system according to the present invention.

SUMMARY OF THE INVENTION

An induction system for a multicylinder internal combustion engine includes a log for receiving air drawn into the engine, and a plurality of runners extending from the log to a plurality of intake ports associated with the cylinders of the engine. A plurality of throttle plates is situated within the runners with at least one throttle plate in each runner. An antireversion air manifold system is supplied with air by the log and has a main passage and a plurality of branches, with at least one branch extending from the main passage of antireversion air manifold to each of the runners at a location between the throttle plate and the intake port being serviced by any particular runner. A plurality of flow control valves is used according to the present invention, with one flow control valve being positioned in each of the branches, such that airflow is allowed within the branches in the direction from the main passage of the antireversion manifold into the ports, but reversion flow is prevented from the ports into the main passage of the antireversion air manifold.

According to another aspect of the present invention, an idle speed control valve is positioned in the an air supply passage extending from the log to the main passage of the antireversion air manifold. An air pressure sensor may be advantageously positioned in the main passage of the antireversion air manifold. A vacuum chamber operatively connected with the log and with the main passage of the antireversion air manifold may be advantageously used as a vacuum reservoir and mixing tank for introduction crankcase ventilation gases and/or recirculated exhaust gas, as well as a vacuum source for a brake booster or other vacuum operated devices.

It is an advantage of the present invention that an engine equipped with the present induction system will have superior idle and part throttle fuel consumption characteristics, because the air pressure within the portion and inlet runner extending between the intake valve and the individual throttle plate of each cylinder will be allowed to come up to atmospheric level when the intake valve for the particular cylinder is closed; because this pressure clearly exceeds any vacuum pressure, the pumping work required to move air into the engine cylinders during the intake stroke of each particular cylinder will be reduced. In fact, in actual engine testing the inventors of the present invention have observed a fuel economy benefit of up to 8%, as compared with conventional multicylinder induction systems having a single throttle plate.

Other advantages as well as objects and features of the present invention will become apparent to the reader of this specification.

DETAILED DESCRIPTION OF PREFERRED EMBODIMENTS

Figure 1:
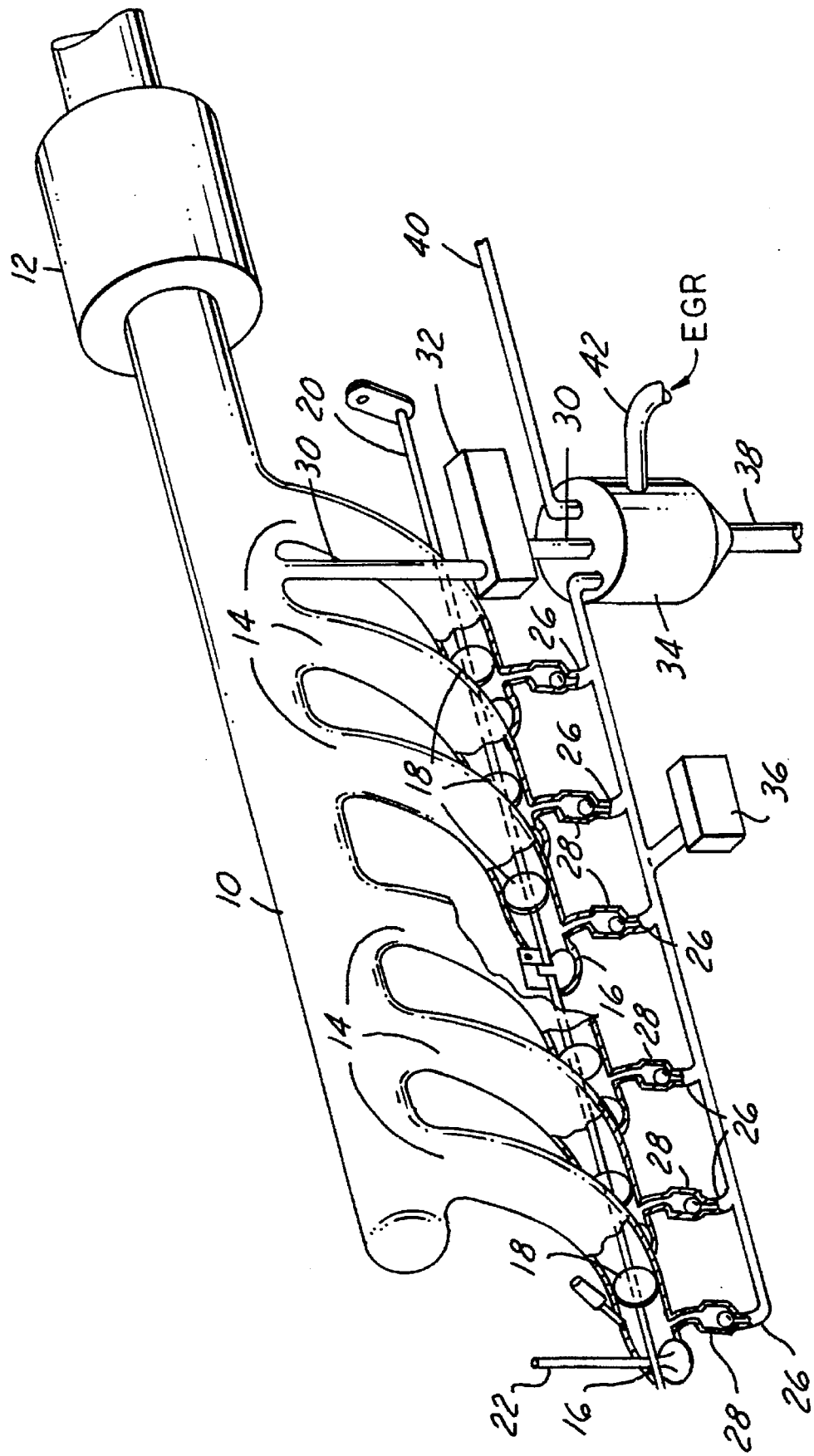
FIG. 1 illustrates an induction system according to the present invention.

As shown in the FIGURE, an induction system for a multicylinder internal combustion engine includes log 10 which is fed air which first passes through air cleaner 12. Notice that no throttle is supplied to the air entering log 10. Air passing through log 10 then passes through intake runners 14, and after passing over individual throttle plates 18 and past intake valves 22, which are located in intake port 16, the intake air enters the engine cylinders (not shown).

During idle operation of an engine equipped with the present induction system, the air required to supply the engine enters the engine cylinders via bypass passage 30 which extends between log 10 and engine speed control valve 32. After passing through engine speed control valve 32, the air enters a final section of bypass passage 30 and then enters vacuum chamber 34.

Vacuum chamber 34, as its name implies, operates at subatmospheric pressure at all times. When any particular cylinder, (in this case there are six in the illustrated embodiment), is operating in its intake stroke during either idle or part throttle operation, air will pass from vacuum chamber 34 and through main passage 24 of the antireversion air manifold system. After entering and passing through main passage 24, the air will pass into one of branches 26 in response to the vacuum originating at the particular cylinder which is on its induction or intake stroke. After entering branch 26, the air will be pulled through one of flow control valves 28, which is illustrated as being a check valve, but which could comprise another type of control valve drawn from the class of those such valves known to those skilled in the art and suggested by this disclosure. After passing through control valve 28, the air enters one of runners 14 at a position between throttle plate 18 and port 16.

Because each of the cylinders of the engine subjects main passage 24 to vacuum during the induction stroke of each particular cylinder, main passage 24 and vacuum chamber 34 will be held at a vacuum. Because chamber 34 is at a vacuum, chamber 34 is useful for introducing crankcase gases through PCV entry tube 38 and recirculated exhaust gas (EGR) through EGR supply tube 42. Upon entering vacuum chamber 34, the PCV and EGR gases will be mixed and distributed through main passage 24 to the various cylinders. Similarly, vacuum chamber 34 may be used as a source of vacuum for brake booster vacuum supply tube 40 and, for that matter, for any other vacuum driven devices employed in a vehicle having an engine with an induction system according to the present invention.

An engine having an antireversion manifold system according to the present invention is well suited to the use of a manifold pressure sensor, 36, which provides information needed to operate the engine with a speed-density type of electronic fuel injection system.

Attention is now drawn to the particular function of flow control valves 28. Notice that flow control valves 28 permit flow in the direction from main passage 24 and into runners 14, but prevent reversion flow from runners 14 into main passage 24. Thus, when any one particular cylinder is on its intake stroke, each of the individual flow control valves 28, with the sole exception of the control valve associated with the cylinder operating in its intake stroke, will be closed. As a result, the pressure of the intake runners 14 of the cylinders which are not on their intake strokes will be unaffected, and the remaining cylinders, i.e., those cylinders not on their intake strokes, will remain at atmospheric pressure. Thus, the engine will not needlessly evacuate the intake runners to a pressure below atmospheric pressure. This is important because the thermodynamic efficiency of an engine equipped with an induction system according to the present invention will be superior to an engine which lacks the flow control valves 28 found with the present system.

A system according to the present invention provides a further advantage inasmuch as the present system may be more easily produced than conventional ported throttle systems because air leakage past the various throttle plates will not result in a flow of air to the other cylinders of the engine; for all practical purposes, idle air flow is controlled only by engine speed control valve 32, because airflow through valve 32 would overwhelm leakage past any one particular throttle plate 18.

While the invention has been shown and described in its preferred embodiments, it will be clear to those skilled in the arts to which it pertains that many changes and modifications may be made thereto without departing from the scope of the invention.

We claim:

1. An induction system for a multicylinder internal combustion engine, comprising:

a log for receiving air drawn into the engine;

a plurality of runners extending from the log to a plurality of intake ports associated with the cylinders of the engine;

a plurality of throttle plates situated within said runners, with at least one throttle plate in each runner;

an antireversion air manifold system supplied with air by said log and having a main passage and a plurality of branches, with at least one branch extending from the main passage to each of said runners at a location between the throttle plate and the intake port; and a plurality of flow control valves, with one flow control valve being positioned in each of said branches such that airflow is allowed within said branches in the direction from said main passage into said ports, but reversion flow is prevented from said ports into said main passage.

2. An induction system according to claim 1, further comprising an engine speed control valve positioned in an air bypass passage extending from the log to the main passage of the antireversion air manifold system.

3. An induction system according to claim 1, further comprising a pressure sensor positioned in the main passage of the antireversion air manifold system.

4. An induction system according to claim 1, further comprising a vacuum chamber operatively connected with said log and with the main passage of the antireversion air manifold system.

5. An induction system according to claim 4, further comprising a crankcase ventilation system operatively connected with said vacuum chamber.

6. An induction system according to claim 4, further comprising an exhaust gas recirculation system operatively connected with said vacuum chamber.

7. An induction system according to claim 4, further comprising an air cleaner for supplying air to the log.

8. An induction system according to claim 1, wherein each of said flow control valves comprises a check valve.

9. An induction system for a multicylinder internal combustion engine, comprising:

a log, attached to an air cleaner, for receiving air drawn into the engine;

a plurality of runners extending from the log to a plurality of intake ports associated with the cylinders of the engine;

a plurality of throttle plates situated within said runners, with one throttle plate in each runner;

an antireversion air manifold system operatively connected with and supplied with air by said log and having a main passage and a plurality of branches extending from the main passage to the intake ports, with the flow of air from the log to the main passage being controlled by an engine speed control valve positioned in an air bypass passage extending from the log to the main passage; and a plurality of flow control check valves, with one flow control check valve being positioned in each of said branches such that airflow is allowed within said branches in the direction from said main passage and into said ports, but reversion flow is prevented from said ports and into said main passage.

10. An induction system according to claim 9, further comprising a pressure sensor positioned in the main passage of the antireversion air manifold system.

11. An induction system according to claim 9, further comprising a vacuum chamber operatively connected between said log and the main passage of the antireversion air manifold system.

12. An induction system according to claim 9, further comprising a crankcase ventilation system operatively connected with said vacuum chamber.

13. An induction system for a multicylinder internal combustion engine, comprising:

a log, operatively associated with an air cleaner, for receiving air drawn into the engine;

a plurality of runners extending from the log to a plurality of intake ports associated with the cylinders of the engine, with a single runner, a single associated intake port, and a single intake valve serving each cylinder of the engine;

a plurality of throttle plates situated within said runners, with one throttle plate in each runner;

an antireversion air manifold system operatively connected with and supplied with air by said log and having a main passage and a plurality of branches extending from the main passage to the intake ports, with a single branch extending from the main passage to each of the intake ports, and with the flow of air from the log to the main passage being controlled by a control valve positioned in an air bypass passage extending from the log to the main passage of the antireversion air manifold system; and a plurality of flow control check valves, with one flow control check valve being positioned in each of said branches such that airflow is allowed within said branches in the direction from said main passage and into said ports, but reversion flow is prevented from said ports and into said main passage, with the result that during idle and part throttle operation of an engine equipped with the present induction system the air pressure within the volume of each runner extending between the mating intake port and the mating throttle valve will increase.

14. An induction system according to claim 13, further comprising a pressure sensor positioned in the main passage of the antireversion air manifold system, so as to measure the pressure within the cylinders at the time the intake valve of each cylinder closes.

15. An induction system according to claim 13, further comprising a vacuum chamber operatively connected with said log and the main passage of the antireversion air manifold system.

16. An induction system according to claim 15, further comprising an exhaust gas recirculation system operatively connected with said vacuum chamber.

* * * * *